A. H. ROIKJER.
CAMERA.
APPLICATION FILED JUNE 22, 1916.

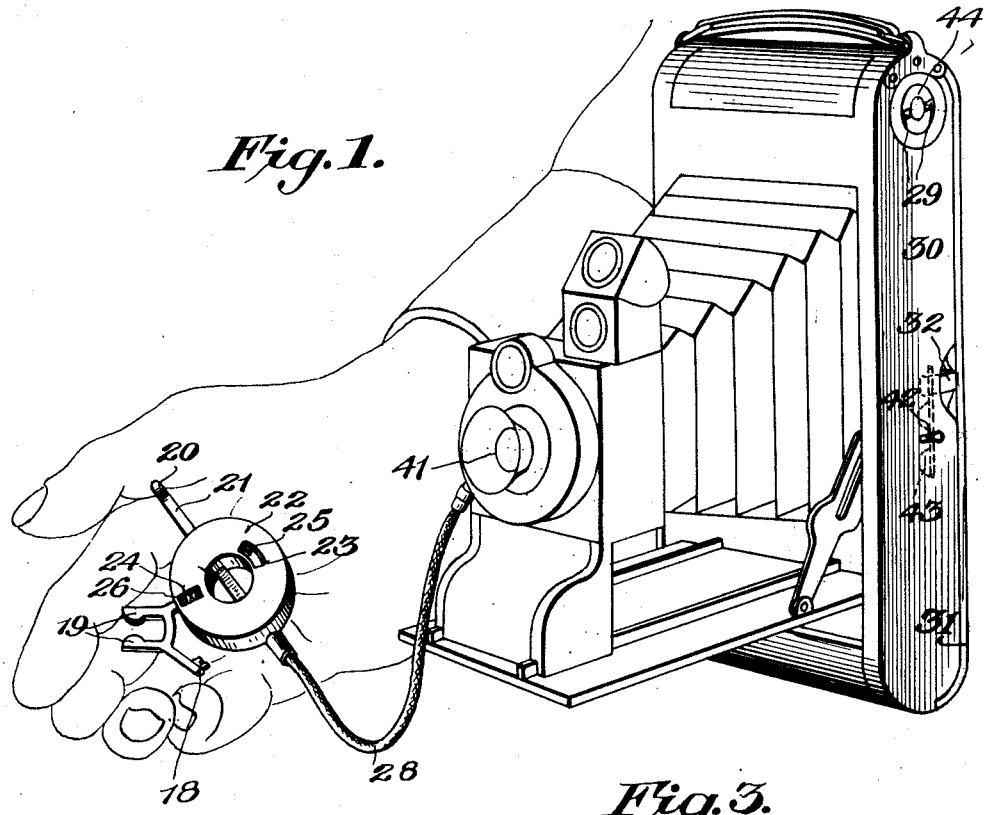
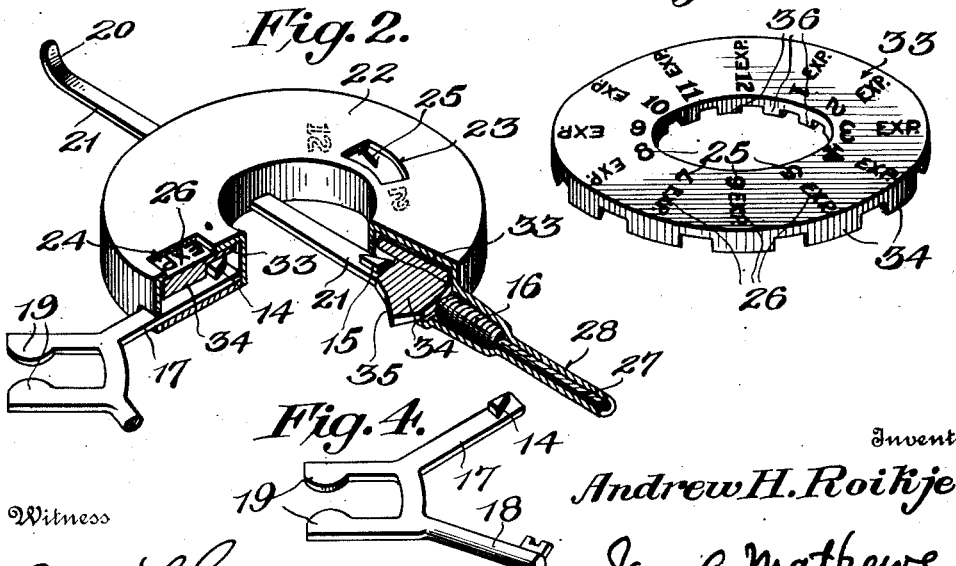

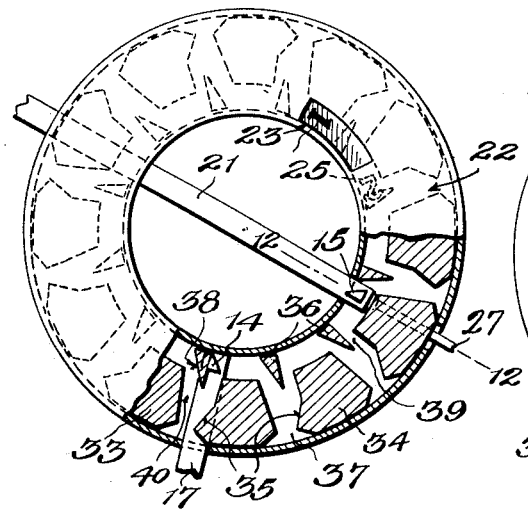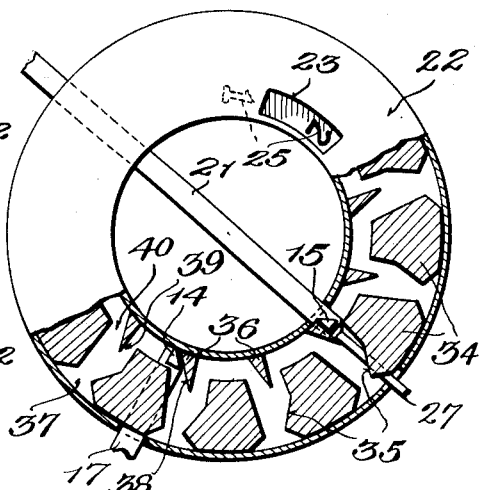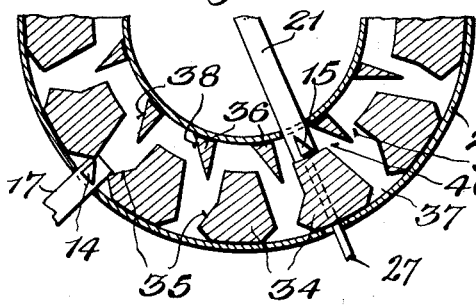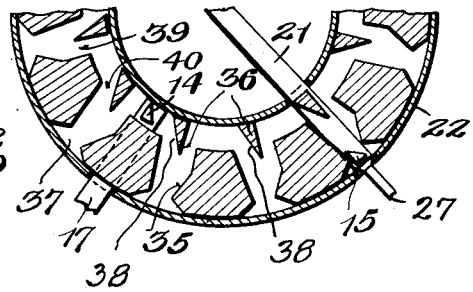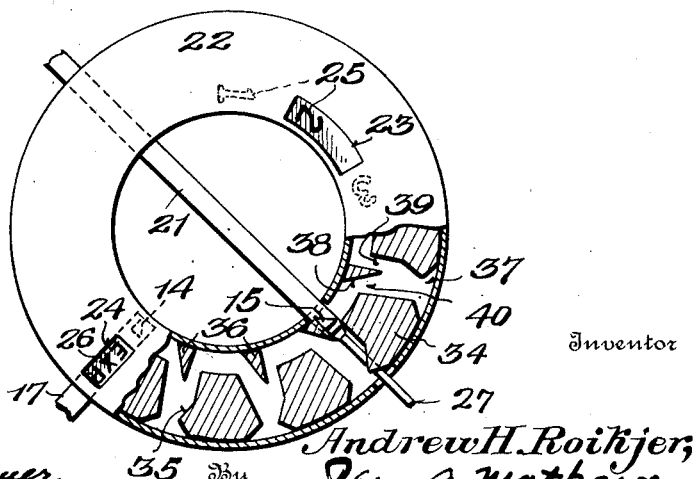

1,277,756.

Patented Sept. 3, 1918.
3 SHEETS—SHEET 3.

Witness
Chas. L. Griestauer
Lester L. Sargent

Inventor
Andrew H. Roikjer,
By Jerry A. Mathens,
Attorney

UNITED STATES PATENT OFFICE.

ANDREW HENRY ROIKJER, OF BOISE, IDAHO.

CAMERA.

1,277,756.   Specification of Letters Patent.   Patented Sept. 3, 1918.

Application filed June 22, 1916. Serial No. 105,229.

*To all whom it may concern:*

Be it known that I, ANDREW H. ROIKJER, a citizen of the United States, residing at Boise, in the county of Ada, State of Idaho, have invented new and useful Improvements in Cameras, of which the following is a specification.

It is my object to provide a novel releasable controlling instrument or key device which is detachable from the shutter actuating and film registering device, said key device having a plurality of integrally formed keys, one of which is adapted to work the shutter and another to wind the film of a camera, the shutter being locked against operation when the key is detached from the film registering device. It is especially my object to eliminate all unwarranted adjustments and accidental displacements of the parts of the camera by the aforesaid means and thereby to lessen the danger of double exposure and blank films occurring. It is further my object to provide a novel combination and arrangement of parts, for use on different kinds of cameras, as shown and claimed. I attain the objects of my invention by the mechanism illustrated, in which—

Figure 1 is a perspective of the invention applied to a camera;

Fig. 2 is a perspective view, partly in section, of the shutter actuating and controlling device;

Fig. 3 is a detail view of registering plate 33;

Fig. 4 is a perspective of my integrally formed shutter key and film key device;

Figure 10:
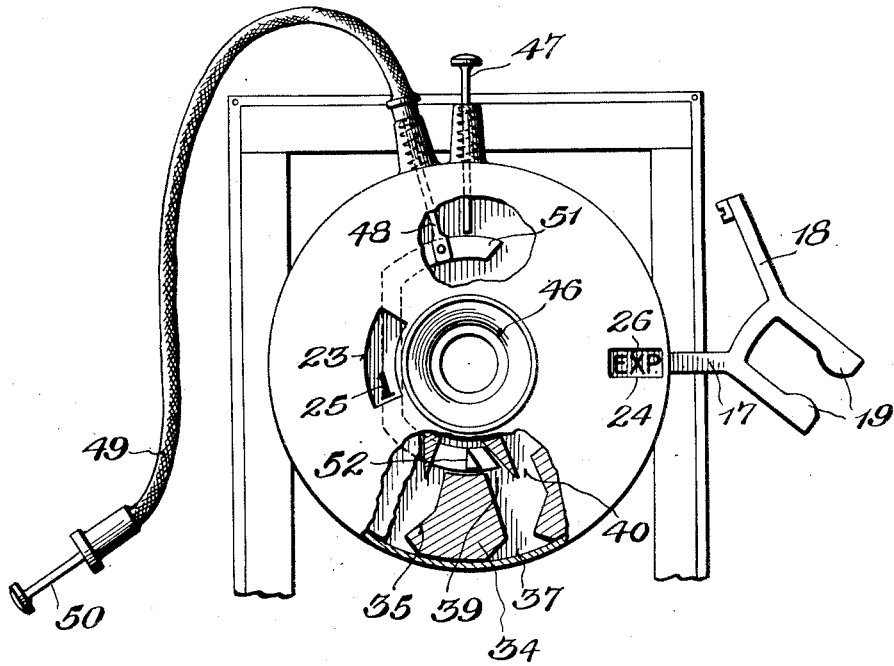
Figure 11:
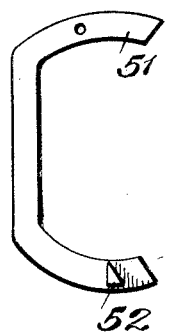

Figs. 5, 6, 7, 8, and 9 are plan views of the rotatable plate and lugs and operating keys 17 and 21 for controlling the operation of the shutter, the views illustrating successive steps in the operation of keys 17 and 21;

Fig. 10 is a front elevation, with parts broken away and in section, illustrating a modified form of the invention in which my shutter controlling device is mounted on the camera;

Fig. 11 is a detail of key 51; and

Figure 12:
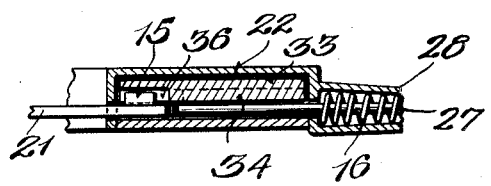

Fig. 12 is a detail sectional view approximately on line 12—12 of Fig. 5.

Like characters of reference designate like parts throughout the views.

As shown in Figs. 1 to 9 inclusive my shutter actuating device may be in the form of a hand piece consisting of an annular casing 22 in which is slidably mounted a shutter actuating key 21, the outer end of which is provided with the thumb piece 20. The opposite or inner end of key 21 is secured to the flexible connection 27 to actuate the shutter. Member 27 is provided with a flexible sheath 28. Key 21 has an upstanding triangular lug 15 near its inner end.

I provide a combined shutter and film key 17, the film key portion of which consists of two arms designated 19, and with which is integrally formed a third key 18 adapted to lock the camera back 31. Key 17 is provided with an upstanding triangular lug 14, this portion of the key being movable radially into casing 22 at an angle to the path of movement of shutter actuating key 21.

The upper face of casing 21 is provided with a transverse opening 24 adjacent the outer edge of the casing 22. Opposite opening 24 I provide a second opening 23 adjacent the inner portion of casing 22. Mounted in casing 22 I provide a rotatable registering plate 33 having on its upper face spaced numerals, preferably progressing from one to twelve, the numerals being disposed adjacent the inner edge of the plate so as to coincide with the opening 23 in the casing 22. The expression "Exp." indicating the word exposure, is placed on plate 33 adjacent to each numeral and in position to be read through opening 26 in the casing so that a numeral and the expression "Exp." will simultaneously appear.

The lower surface of plate 33 is provided with spaced lugs 34 of the peculiar irregular shape shown in the drawing. The spaces between these lugs provide the channels 37 through which the lugs 14 and 15 of keys 17 and 21 respectively are movable. Lugs 34 have the angular or inclined side 35 which lugs 14 and 15 engage in their movement toward the outer edge of the ring or plate 33, such movement slightly rotating plate 33 in a counter clockwise direction.

Plate 33 is also provided with spaced inner lugs 36 of triangular shape with their hypotenuses or inclined faces 38 remote from faces 35 of lugs 34, thereby terminating channels 37 in the passages 40 and 39. Channel 40 is adjacent to face 38 of lug 36, as illustrated in Fig. 6, and in this channel lugs 14 and 15 move when the keys 17 or 21 are pushed in. When the keys are moved outwardly lugs 14 and 15 travel through passage 39. 41 designates the opening which contains the camera lens.

In Fig. 5 the parts are shown in their position after exposure of film number one has been made. The numeral one will then appear in sight opening 23 and the abbreviation "Exp." (which I have designated as indicator 26) simultaneously appears in sight opening 24. Key 17 is then withdrawn, thereby moving plate 33 by reason of the contact of lug 14 against the inclined face 35 of the lug 34 on the rotatable plate. This causes plate 33 to rotate slightly in a counter clockwise direction. In doing so the numeral one is moved beyond the sight opening 23, and "Exp." also disappears from sight opening 24. At this stage of the operation plate 33 is in the position shown in Fig. 6. At this time lug 15 of key 21 is locked against shutter actuating movement due to the fact that one of the lugs 34 of plate 33 has been moved into the path of lug 15 in consequence of the slight rotation of plate 33 caused by the withdrawal of key 17. The relative position of the lugs to effect this coördination of operation is important in preventing operation of the shutter key 21 when key 17 has been withdrawn for the purpose of winding the film.

In order to bring the next unexposed section of the film into position for use key 17 is withdrawn and the arms 19 are inserted in slots 29 of the film spool 44. These slots 29 take the place of the usual hand piece for turning the spool, so that the person operating the camera cannot shift the position of the film without the use of the arms 19 of the key 17, and when this is used plate 33 is in such position as to prevent operation of the shutter in consequence of the position of lugs 34, one of which is in the path of lug 15 of key 21, at the time key 17 is withdrawn.

Integral with key 17 is a third key 18 adapted to be inserted in the key slot 42 to move lock 43 in and out of clasp 32 to release the camera back. Lock 43 is shown in dotted lines in Fig. 1.

To permit of a new exposure key 17 is again inserted in channel 37 of the rotatable plate 33 between its lugs 34. Lug 14 on key 17 as it moves inwardly causes a further slight rotation of plate 33 in a counter clockwise direction to the position shown in Fig. 7, thus moving the numeral two of the series designated 25 into the sight opening 23 at its near end, but with the sight opening 24 still blank at this time. This slight rotation of plate 33 frees the shutter actuating key 21 for longitudinal movement. When the operator is ready to take a picture key 21 is pressed inwardly. It thereupon strikes the inclined face 35 of the adjacent lug 34, causing another slight rotation of plate 33 in the same direction. Upon being released the key 21 is pushed out by spring 16. Thereupon lugs 15 of key 21 engages against the inclined face or hypotenuse 38 of lug 36, thus causing another slight rotation, in the same direction, of plate 33. The numeral is thereupon brought into view in the farther end of opening 23. The abbreviation "Exp," is brought into view in opening 24 at the end of the outward movement of shutter key 21, and at the end of its succeeding inward movement, as shown, respectively in Figs. 8 and 9.

The function of key 18 is to release clasp 32 to permit of removal of camera back 31 from sides 30. The integral construction of the keys affords an additional safeguard against accidental or unwarranted shifting or changing of the film.

In Fig. 10 is illustrated a modified arrangement of the invention having a modified shape of key 51, which also is provided with a triangular lug 52, the function of which is the same as in the first described key 21, the change being principally one of shape, this key, however, being operable by a flexible spring controlled connection 48 (inclosed in sheath 49) and operated by a suitable finger piece 50. I provided a supplemental actuating finger piece 47 which may be employed for moving key 51 to operate the shutter, should this mode of operation be preferred.

My invention can be made and applied to any camera at comparatively small expense and is simple and reliable in operation, and does not require elaborate changes in the construction of the camera.

What I claim is:

1. In combination with a camera, a shutter controlling device including a manually controlled shutter operating member slidably mounted therein and means for locking said member, a separate device consisting of integrally connected key portions, one of which under manual control unlocks the shutter operating member and another key-portion of which is adapted to wind the film, a film spool having slotted portions adapted to be engaged and operated by the last mentioned key portion, the locking means for the shutter operating member preventing operation of said member to actuate the shutter when its coöperating key portion is withdrawn.

2. In combination with a camera, a shutter controlling device having an annular rotatable plate, the plate having spaced indicating markings, and having an annular series of spaced lugs, the lugs having inclined faces, a casing in which the aforesaid plate is rotatably mounted, the plate having sight openings through which the indicating markings may be viewed, a manually controlled shutter operating member in operative engagement with the lugs on the rotatable plate, an actuating key device mounted to engage the inclined faces of the lugs on the rotatable plate, the faces of the lugs being positioned to impart rotation to the plate in the same direction during the movement of the key and the shutter operating member in opposite directions to render difficult accidental operation of the shutter before the film has been shifted.

3. In combination with a camera, a combined shutter controlling and film registering device having means for indicating successive operations of the shutter, a plurality of manually operable devices, one of which is non-detachable from the aforesaid controlling and registering device and the other of which is detachable therefrom, the detachable device having integrally formed with it a film roll operating key, a film roll having slots in its head to be engaged by the aforesaid key, and means on the shutter controlling and film registering device to make difficult the operation of the shutter when the detachable device is withdrawn for the purpose of winding the film, whereby to lessen the liability of double exposures.

4. In combination with a camera, a film spool having key-slots therein, a shutter controlling device including a shutter operating member and means for locking the same, a detachable shutter controlling key adapted to unlock the shutter operating member, the aforesaid key having integrally formed therewith a key member shaped to engage the key slots and operate the film spool when withdrawn from the shutter controlling device, the locking means preventing operation of the shutter operating member when said key is withdrawn.

5. As a new article of manufacture, an integrally formed key device for controlling a shutter operating device and for winding the film spool, said key device consisting of a key member having an upstanding triangular lug near its end, and a film-spool-winding key member integrally connected with the aforesaid key member, substantially as described.

6. As a new article of manufacture, a key device shaped to operate a camera shutter control device but releasable therefrom, said key device having integrally formed thereon a second key device adapted to engage and operate a film spool in lieu of the usual spool winding device, and a third key member integrally formed with the aforesaid key members and adapted to operate a lock on the camera back, whereby unwarranted adjustments or operation of the camera through inadvertence is rendered improbable.

7. In combination with a camera, a shutter controlling and film registering device having an annular rotatable plate having exposure indicating markings thereon, the plate having an annular series of spaced lugs having inclined faces, a casing in which said plate is mounted the casing having sight openings through which the exposure indicating markings may be read, and having guide portions, a shutter operating member movable in certain of said guides, and having a projection movable in spaces between the lugs and adapted to engage the faces of the lugs to impart rotation to the plate in the same direction, a separate shutter control key movable in the casing at an angle to the direction of the movement of the shutter actuating member, the separate shutter control key having a projection engageable with the inclined faces of the lugs to impart rotation to the plates when the controlling member is inserted within and removed from the casing, the lugs being positioned to lock the actuating member against operative movement when the separate control key is removed.

8. In combination with a camera having a slotted film winding stem, a manually operated shutter controlling device including a shutter operating member and means for locking the same, a key device detachably engageable with said locking means to unlock the shutter operating member, said key device having an integrally formed key member for engaging the film winding spool.

ANDREW HENRY ROIKJER.